US008974955B2

(12) United States Patent
Min et al.

(10) Patent No.: US 8,974,955 B2
(45) Date of Patent: *Mar. 10, 2015

(54) METHOD FOR MANUFACTURING BATTERY CELL AND BATTERY CELL MANUFACTURED USING THE SAME

(71) Applicant: LG Chem, Ltd., Seoul (KR)

(72) Inventors: Ki Hong Min, Gwacheon-si (KR); Sung Min Hwang, Cheongju-si (KR); Jihoon Cho, Daejeon (KR); TaeYoon Jung, Cheongwon-gun (KR); Changmin Han, Cheongju-si (KR); Hyun-sook Baik, Cheongju-si (KR); Jeong Sam Son, Cheongju-si (KR); Jae Hoon You, Cheongju-si (KR); Su Taek Jung, Cheongju-si (KR); Hyeong Kim, Daegu (KR); Sung Hyun Kim, Cheongju-si (KR); Ki Hun Song, Hwaseong-si (KR); Sang Hyuck Park, Suwon-si (KR); Han Sung Lee, Incheon (KR); Byeong Geun Kim, Anyang-si (KR)

(73) Assignee: LG Chem, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/874,503

(22) Filed: May 1, 2013

(65) Prior Publication Data

US 2013/0244093 A1 Sep. 19, 2013

Related U.S. Application Data

(63) Continuation of application No. PCT/KR2011/008468, filed on Nov. 8, 2011.

(30) Foreign Application Priority Data

Dec. 2, 2010 (KR) .................. 10-2010-0122334

(51) Int. Cl.
*H01M 2/08* (2006.01)
*H01M 10/04* (2006.01)
(Continued)

(52) U.S. Cl.
CPC .............. *H01M 10/04* (2013.01); *H01M 2/021* (2013.01); *H01M 2/0212* (2013.01);
(Continued)

(58) Field of Classification Search
USPC ..................... 429/210, 185, 50, 162
See application file for complete search history.

(56) References Cited

U.S. PATENT DOCUMENTS

| 3,785,873 | A | * | 1/1974 | Leeson et al. ................... 429/82 |
| 8,252,452 | B2 | | 8/2012 | Yoon et al. |
| 2001/0004504 | A1 | | 6/2001 | Nakamizo et al. |
| 2006/0286450 | A1 | | 12/2006 | Yoon et al. |
| 2007/0154803 | A1 | | 7/2007 | Kim et al. |
| 2007/0202399 | A1 | | 8/2007 | Shin et al. |
| 2009/0253038 | A1 | * | 10/2009 | Segawa et al. ................ 429/210 |
| 2010/0028772 | A1 | | 2/2010 | Yang et al. |

FOREIGN PATENT DOCUMENTS

| CN | 1305239 | A | | 7/2001 |
| CN | 101541428 | A | | 9/2009 |
| EP | 1045463 | A1 | * | 10/2000 |
| JP | 2006-278331 | A | | 10/2006 |
| JP | 2008-166068 | A | | 7/2008 |
| KR | 2001-0082058 | A | | 8/2001 |
| KR | 2001-0082059 | A | | 8/2001 |
| KR | 2001-0082060 | A | | 8/2001 |
| KR | 10-2005-0121112 | A | | 12/2005 |
| KR | 10-0719736 | B1 | | 5/2007 |
| KR | 10-2008-0011477 | A | | 2/2008 |
| TW | I324836 | B | | 5/2010 |
| TW | I332278 | B | | 10/2010 |

OTHER PUBLICATIONS

International Search Report issued in PCT/KR2011/008468, mailed on Jun. 26, 2012.

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Disclosed is a method for manufacturing a battery cell including an electrode assembly and electrolyte provided in a battery case composed of a laminate sheet having a resin layer and a metal layer, which includes; (a) thermally fusing and sealing the periphery of the case except for an end part thereof while the electrode assembly is mounted in the case; (b) introducing the electrolyte through the unsealed end part then sealing the same by thermal fusion; (c) charging and discharging the battery cell to activate the same; (d) puncturing the unsealed part inside the end part to form a through-hole communicating with the inside of the case; and (e) pulling top and bottom faces of the battery case in the opposite direction to each other at the unsealed part to open the same while applying vacuum pressure, to thereby remove the gas generated during activation as well as excess electrolyte.

8 Claims, 11 Drawing Sheets

(51) Int. Cl.
  *H01M 2/02* (2006.01)
  *H01M 10/052* (2010.01)
  *H01M 10/0585* (2010.01)
  *H01M 2/36* (2006.01)
  *H01M 6/50* (2006.01)

(52) U.S. Cl.
  CPC ......... *H01M 2/0287* (2013.01); *H01M 6/5088* (2013.01); *H01M 10/0436* (2013.01); *H01M 10/052* (2013.01); *H01M 10/0585* (2013.01); *Y02E 60/122* (2013.01); *H01M 10/0404* (2013.01); *H01M 10/0431* (2013.01); *H01M 2/36* (2013.01)
  USPC .............. 429/185; 429/50; 429/162; 429/210

\* cited by examiner

METHOD FOR MANUFACTURING BATTERY CELL AND BATTERY CELL MANUFACTURED USING THE SAME

CROSS REFERENCE TO RELATED APPLICATIONS

This application is a Continuation of PCT International Application No. PCT/KR2011/008468 filed on Nov. 8, 2011, which claims priority under 35 U.S.C. §119(a) to Patent Application No. 10-2010-0122334 filed in the Republic of Korea on Dec. 2, 2010, all of which are hereby expressly incorporated by reference into the present application.

TECHNICAL FIELD

The present invention relates to a method for fabrication of battery cells and, more particularly, to a method for manufacturing a battery cell which includes an electrode assembly and an electrolyte provided in a battery case composed of a laminate sheet having a resin layer and a metal layer, including: (a) thermally fusing and sealing the periphery of the battery case except for an end part thereof while the electrode assembly is mounted in the battery case; (b) introducing the electrolyte through the unsealed end part then sealing the same via thermal fusion; (c) charging and discharging the battery cell to activate the same; (d) puncturing the unsealed part inside the end part to form a through-hole communicating with the inside of the battery case; and (e) pulling top and bottom faces of the battery case in the opposite direction to each other at the unsealed part to open the same while applying vacuum pressure, to thereby remove the gas generated during activation as well as excess electrolyte.

BACKGROUND ART

As technological development of mobile instruments and demands thereof are increased, a demand for batteries as an energy source is also increasing. Accordingly, extensive studies into batteries satisfying a number of requirements have been executed.

For representative examples in terms of battery morphology, an angled secondary battery and a pouch type secondary battery, which have a relatively small thickness and are thus applicable for articles such as mobile phones (also known as cellular phones), are in high demand. In terms of raw materials thereof, a lithium secondary battery, i.e., a lithium ion battery, a lithium ion polymer battery, etc., which has advantages such as high energy density, discharge voltage and/or output stability, is widely required.

Alternatively, a secondary battery may be classified in terms of types of a cathode/separator/anode structure of an electrode assembly and include, as representative examples, a jelly-roll (winding type) electrode assembly having a construction of winding a cathode and an anode while interposing a separator therebetween; a stack (laminate type) electrode assembly wherein a plurality of cathodes and anodes cut into pieces to a predetermined unit size are sequentially stacked while interposing a separator therebetween; a stack/folding electrode assembly having a construction of winding bi-cells or full cells, while interposing a separator between a cathode and an anode having a predetermined unit size, and so forth.

Recently, a pouch type battery having a construction of mounting a stack type or a stack/folding type electrode assembly in an aluminum laminate sheet has attracted considerable interest because of low production cost, light-weight, easy variations in shape, etc., and use thereof is also gradually increasing.

FIG. 1 is an exploded perspective view schematically illustrating a general structure of a conventional and typical pouch type battery.

Referring to FIG. 1, a pouch type battery 10 may have an electrode assembly 30, electrode taps 40, 50 extending from the electrode assembly 30, electrode leads 60, 70 welded to the electrode taps 40, 50, and a battery case 20 receiving the electrode assembly 30.

The electrode assembly 30 is a power generating device wherein a cathode and an anode are sequentially laminated while interposing a separator therebetween, and may have a stack type or a stack/folding type structure. The electrode taps 40, 50 may extend from each polar sheet of the electrode assembly 30, while the electrode leads 60, 70 may be electrically connected to a plurality of electrode taps 40, 50, respectively, which extend from the polar sheets, by, for example, welding. Each of the electrode leads 60, 70 may have an insulating film 80 attached to a part of each top or bottom face, in order to improve sealing to the battery case 20 while ensuring electrical insulation thereof.

The battery case 20 may provide a space to receive the electrode assembly 30, and be of a pouch type in terms of morphology. For a laminate type electrode assembly 30 as shown in FIG. 1, in order to combine a plurality of cathode taps 40 and anode taps 50 with the electrode leads 60, 70, an inner top end of the battery case 20 is spaced from the electrode assembly 30.

Since secondary batteries including the foregoing pouch type battery mostly undergo activation of the battery by charge-discharge in a process of manufacturing a battery cell, gas generated during activation should be removed in order to manufacture a final battery cell and this operation may be called a 'degassing' operation.

However, the conventional process for manufacturing a pouch type battery as described above, entails some problems in that: considerable time is required to remove gas in a degassing operation wherein a sealed end is cut and gas is degassed, in turn increasing production costs; and the gas and excess electrolyte are not completely eliminated, in turn causing not a few failures in a sealing operation through thermal fusion.

Accordingly, there is still a high requirement for techniques to solve conventional problems described above.

DISCLOSURE

Technical Problem

Therefore, the present invention is directed to solving conventional problems described above and to overcoming technical restrictions in the related art.

More particularly, an object of the present invention is to provide a method for manufacturing a battery cell with improved quality and productivity, which includes: puncturing an unsealed part inside an end to form a through-hole communicating with the inside of the battery case after activating the battery cell through charge-discharge; and pulling top and bottom faces of the battery case at the unsealed part to open the same while applying vacuum pressure thereto, to thereby completely remove excess electrolyte as well as gas generated during activation.

Another object of the present invention is to provide a battery cell manufactured by a simple process while ensuring productivity and quality as described above.

Technical Solution

In order to accomplish the foregoing objects, a method for manufacturing a battery cell comprising an electrode assembly and an electrolyte provided in an battery case made of a laminate sheet including a resin layer and a metal layer according to the present invention may include: (a) mounting the electrode assembly in the battery case and sealing the other parts except for one end part among a peripheral side of the battery case through thermal fusion; (b) introducing the electrolyte through the unsealed end part and sealing the end by thermal fusion; (c) conducting charge-discharge; (d) puncturing the unsealed part inside the end part to form a through-hole communicating with the inside of the battery case; and (e) pulling the top and bottom faces of the battery case opposite each other at the unsealed part to open the same while apply vacuum pressure, to thereby remove excess electrolyte as well as gas generated in an activation operation.

Therefore, the method for manufacturing a battery cell according to the present invention includes the operation of puncturing the unsealed part inside the end part to form a through-hole communicating with the inside of the battery case and the operation of pulling the top and bottom faces of the battery case in the opposite direction to each other to open the same while applying vacuum pressure, to thereby easily and rapidly remove excess electrolyte as well as the gas generated in the activation operation, compared to any conventional method for manufacturing a battery cell.

Since the gas and excess electrolyte are completely removed under vacuum, quality of the battery cell, that is, safety and life characteristics of the battery cell may be improved by high bonding ability of the sealing part through thermal fusion.

For reference, a lithium secondary battery may include, for example, a cathode active material comprising a lithium transition metal oxide such as $LiCoO_2$, as well as an anode active material comprising a carbon material, and the battery may be fabricated by interposing a polyolefin based porous separator between the anode and the cathode and introducing a non-aqueous electrolyte containing a lithium salt such as $LiPF_6$ therebetween. When the battery is charged, lithium ions in the cathode active material are discharged and enter the carbon layer in the anode. On the other hand, during discharging, lithium ions in the anode carbon layer are discharged and enter the cathode active material. In this regard, the non-aqueous electrolyte may function as a medium to move the lithium ions between the anode and the cathode. Such a lithium secondary battery must primarily be stable in the range of operating voltage of the battery and have performance to deliver ions at a sufficiently high speed.

However, the electrolyte is decomposed on the surface of an anode active material during continuous charging and discharging, thus generating gas, while an SEI film is formed on the surface of the anode active material at the early charging and discharging to inhibit further generation of the gas. Accordingly, operation (c) for activating the battery cell is needed to form the SEI film and necessarily performed before a final stage of completing the battery cell.

The laminate sheet according to the present invention may have a laminate structure comprising an external resin layer, a metal layer for shielding air and moisture and a thermally fusible internal resin layer.

The external resin layer must have excellent resistance against the external environment, therefore, desired tensile strength and weather-proof properties are required. In such aspects, a polymer resin for an external coating layer may include polyethylene naphthalate (PEN), polyethylene terephthalate (PET) or stretched nylon, which have excellent tensile strength and weather-proof properties.

The external coating layer may comprise polyethylene naphthalate (PEN) and/or be provided with a polyethylene terephthalate (PET) layer at an outer face thereof.

Polyethylene naphthalate (PEN) exhibits superior tensile strength and weather-proof properties while having a small thickness, compared to polyethylene terephthalate (PET), thereby being preferably employed as an external coating layer.

The polymer resin of the internal resin layer may be a polymer resin which has thermal fusibility (thermal adhesiveness) and low absorption of an electrolyte to inhibit penetration thereof, and undergoes minimal expansion or corrosion by the electrolyte. More preferably, the polymer resin may comprise a non-stretched (commonly known as 'cast') polypropylene film (CPP).

According to a preferred embodiment, a laminate sheet of the present invention may have a structure comprising the external coating layer having a thickness of 5 to 40 μm, a barrier layer having a thickness of 20 to 150 μm and an internal sealant layer having a thickness of 10 to 50 μm. If each of these layers in the laminate sheet is too thin, it is difficult to improve shielding functions to a material and strength thereof. On the contrary, if the layer is too thick, processing thereof may become more difficult while causing an increase in thickness of the sheet, thus not being preferable.

The electrode assembly is not particularly limited so long as it has a structure of connecting plural electrode taps to construct a cathode and an anode. Preferably, a winding type, stack type, and/or stack/folding type structure may be used. For instance, an electrode assembly having the stack/folding type structure described above has been described in detail in published documents, for example, in Korean Laid-Open Patent Publications Nos. 2001-0082058, 2001-0082059 and 2001-0082060, the disclosures of which are incorporated herein by reference in their entireties.

The battery case may have different shapes and, preferably, is rectangular in a plan view. In this case, an end part thereof may be an edge portion.

In such a structure, a width of the above edge may be 20 to 300% larger than a width of the other edges and, during activation through thermal fusion, the end of the above edge may be sealed.

For instance, if the width of the above edge is less then 20% of each width of the other edges, a desired amount of gas cannot be sufficiently entrapped in a space in the above edge. On the other hand, when the width of the above edge exceeds 300% of each width of the other edges, edge extent may be increased, in turn increasing production costs. Therefore, the foregoing is not preferable in terms of economical aspects.

According to a preferred embodiment, vacuum pressure is applied while pulling top and bottom faces of the battery case toward each other, that is, in opposite directions by a suction device, to thereby easily discharge gas generated inside the battery cell by the suction device having increased suction force due to the vacuum pressure.

More particularly, after the suction device adsorbs the top and bottom faces of the battery case under vacuum and then opens a space therebetween to ensure an output path ('vent'), the gas and the electrolyte may be discharged through vacuum suction.

For example, the suction device may comprise a first suction pad contacting the top face of the battery case and a second suction pad contacting the bottom face of the same.

In such a structure, each of the first and second suction pads may have a structure comprising an adhesion part contacting the outer side of the battery case and a hollow part that is connected to the adhesion part, communicates with a through-hole formed at an unsealed part of the battery case and applies vacuum pressure.

The present invention may also include a means for accelerating activation of the battery cell to rapidly entrap the gas in the unsealed part.

Such acceleration may include, for example, heating the battery cell in order to increase a temperature of the electrolyte during at least one of operations (c) to (e), thus improving flowability.

In other words, applying thermal energy to the battery cell may activate movement of the gas while decreasing viscosity of the electrolyte, to thereby accelerate smooth output of the gas and the electrolyte.

If the above heat application to the battery cell is included in operation (c), heat may influence charge-discharge of the battery cell. Therefore, the application of heat to the battery cell is preferably added to any one of operations (d) and (e).

In such a construction, a temperature of the application of heat may range from about 40 to 80° C., for example. If the temperature is less than 40° C., activation of the battery cell cannot be performed by desired charge-discharge. When the temperature exceeds 80° C., activation of the battery cell is over-activated (hyperactive) and may cause a problem of explosion of the battery cell, thus not being preferable.

According to another embodiment, applying ultrasonic vibration to the battery cell may be included in at least one of operations (c) to (e).

However, in the case where the application of ultrasonic vibration to the battery cell is included in operation (c) for activating the battery cell, it may influence charge-discharge of the battery cell. Therefore, the application of ultrasonic vibration to the battery cell is preferably included in any one of operations (d) and (e).

In such a construction, an ultrasonic frequency may range from about 15 kHz to 100 kHz.

Meanwhile, a method for manufacturing a battery cell according to the present invention may further include sealing the inside of the unsealed part through thermal fusion and cutting off the other (outer) part, after operation (e) described above.

Also, the present invention may provide a battery cell manufactured by the foregoing method.

The battery cell may be a lithium secondary battery. The lithium secondary battery may comprise a cathode, an anode, a separator and a non-aqueous electrolyte containing lithium.

The cathode may be fabricated by, for example, mixing a cathode mix in a solvent such as NMP to prepare a slurry then applying the slurry to an anode current collector, followed by drying and rolling the same.

The cathode mix may optionally include a conductive material, a binder, a filler, etc., in addition to a cathode active material.

The cathode active material may be a material capable of undergoing electro-chemical reaction, and comprise a lithium transition metal oxide, which contains two or more transition metals, for example; a lamellar compound such as lithium cobalt oxide ($LiCoO_2$), lithium nickel oxide ($LiNiO_2$), etc. which is substituted with one or more transition metals; lithium manganese oxide substituted with one or more transition metals; lithium nickel oxide represented by $LiNi_{1-y}M_yO_2$ (wherein M=Co, Mn, Al, Cu, Fe, Mg, B, Cr, Zn or Ga, the oxide contains at least one of these elements, and y satisfies $0.01 \leq y \leq 0.7$); lithium nickel cobalt manganese composite oxide represented by $Li_{1+z}Ni_bMn_cCo_{1-(b+c+d)}M_dO_{(2-e)}A_e$ (wherein $-0.5 \leq z \leq 0.5$, $0.1 \leq b \leq 0.8$, $0.1 < c \leq 0.8$, $0 \leq d \leq 0.2$, $0 \leq e \leq 0.2$, b+c+d<1, M=Al, Mg, Cr, Ti, Si or Y, and A=F, P or Cl) such as $Li_{1+z}Ni_{1/3}Co_{1/3}Mn_{1/3}O_2$, $Li_{1+z}Ni_{0.4}Mn_{0.4}Co_{0.2}O_2$; olefin-based lithium metal phosphate represented by $Li_{1+x}M_{1-y}M'_yPO_{4-z}X_z$ (wherein M is a transition metal, preferably, Fe, Mn, Co or Ni, M'=Al, Mg or Ti, X=F, S or N, and $-0.5 \leq x \leq +0.5$, $0 \leq y \leq 0.5$, $0 \leq z \leq 0.1$), and so forth, without being particularly limited thereto.

The conductive material is generally added in an amount of 1 to 30 wt. % relative to a total weight of a mixture including the cathode active material. Such conductive material is not particularly restricted so long as it has conductive properties without causing chemical modification of the battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The binder described above assists in combination of an active material with a conductive material and bonding to a current collector and is normally added in an amount of 1 to 30 wt. %, relative to a total weight of a mixture containing a cathode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, various copolymers, and so forth.

The filler is a supplementary ingredient to inhibit expansion of a cathode, is optionally used and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

The cathode current collector described above is generally fabricated to have a thickness in the range of 3 to 500 μm. Such cathode current collector is not particularly restricted so long as it has conductivity without causing chemical modification of a battery. For example, the cathode current collector may be fabricated using stainless steel, aluminum, nickel, titanium, calcined carbon, or aluminum or stainless steel surface-treated with carbon, nickel, titanium or silver, and so forth. The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The anode used herein is fabricated by, for example, applying an anode mix containing an anode active material to an anode current collector then drying the coated collector, and the anode mix may optionally include the foregoing components, that is, the conductive material, the binder, the filler, etc.

Examples of the anode active material may include: carbon and graphite materials such as natural graphite, artificial graphite, expanded graphite, carbon fiber, non-graphitizing carbon (often referred to as 'hard carbon'), carbon black, carbon nanotubes, fullerene, activated carbon, etc.; metals alloyable with lithium, such as Al, Si, Sn, Ag, Bi, Mg, Zn, In, Ge, Pb, Pd, Pt, Ti, etc., as well as compounds containing the same; combination of carbon and graphite materials with metals and compounds thereof; lithium containing nitrides, and so forth. Among these, carbon active materials, silicon active materials, tin active materials or silicon-carbon active materials are preferably used and these materials may be used alone or in combination of two or more thereof.

The anode current collector is generally fabricated to have a thickness in the range of 3 to 500 µm. Such anode current collector is not particularly restricted so long as it has high conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth. Similar to the cathode current collector, the anode current collector may be processed to have fine irregularities on the surface thereof, so as to enhance adhesion to an electrode active material. In addition, the anode current collector may have various forms including films, sheets, foils, nets, porous structures, foams, non-woven fabrics, etc.

The separator used herein is interposed between the cathode and the anode and may be formed using a thin insulation film having a high ion permeability and excellent mechanical strength. The separator typically has a pore diameter of 0.01 to 10 µm and a thickness of 5 to 300 µm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

The non-aqueous electrolyte containing lithium salt used herein comprises a lithium salt as well as a non-aqueous electrolyte. The non-aqueous electrolyte may be a non-aqueous organic solvent, organic solid electrolyte, inorganic solid electrolyte, or the like.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, or the like.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, $LiI$, $Li_5NI_2$, $Li_3N$-$LiI$-$LiOH$, $LiSiO_4$, $LiSiO_4$-$LiI$-$LiOH$, $Li_2SiS_3$, $Li_4SiO_4$, $Li_4SiO_4$-$LiI$-$NiOH$, $Li_3PO_4$-$Li_2S$-$SiS_2$, etc.

The lithium salt used herein is a material readily dissolved in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas.

The secondary battery fabricated according to the present invention may be used for a battery cell which is a power source for a small device, and also be employed as a unit cell of a battery pack including a plurality of battery cells wherein the battery pack is used as a power source for any medium and/or large-scale device requiring high thermal property, long cycle property, high rate property, etc.

Preferred examples of medium and/or large-scale devices described herein may include: power tools operated by power from a battery motor; electric automobiles including, for example, electric vehicles (EV), hybrid electric vehicles (HEV), plug-in hybrid electric vehicles (PHEV), etc.; electric two-wheel vehicles including, for example, electric bikes, electric scooters, etc.; electric golf carts, and so forth, without being particularly limited thereto.

The present invention may also provide an apparatus used for a process of removing excess electrolyte as well as the gas generated in the activation operation in the method for manufacturing a battery cell.

More particularly, the inventive apparatus may have a structure comprising:

a holder for mounting the battery cell such that one end of a battery case having a through-hole formed thereon is protruded in one direction;

a press block pressing the battery cell mounted on the holder, from the top side;

a pair of sealing blocks provided at an outer side of the holder to seal the end part of the battery case through thermal fusion; and a pair of suction pads that pull top and bottom faces of the battery case at the end of the battery case having the through-hole formed thereon, toward each other (that is, in opposite directions) to open the same while applying vacuum pressure, to thereby remove excess electrolyte as well as gas generated in the activation operation.

Accordingly, since the above apparatus includes a pair of suction pads capable of pulling the top and bottom faces of the battery case at an end of the battery case, in which a through-hole is formed, in the opposite direction to each other to open the same while applying vacuum pressure, excess electrolyte and the gas generated in the activation operation may be rapidly and completely removed.

The inventive apparatus may strongly press the battery cell using a press block, thus accelerating discharge of the gas and excess electrolyte.

According to a preferred embodiment, the holder may have a heater equipped therein to heat the battery cell.

Therefore, the heater applies heat to the battery cell to increase kinetic energy of the gas and, at the same time, the suction pad may suck the gas under vacuum and, therefore, the above apparatus may considerably reduce a time required for gas removal.

According to another preferred embodiment, the holder may have a supersonic vibrator equipped therein to apply ultrasonic vibration to the battery cell.

Accordingly, the ultrasonic vibrator applies ultrasonic vibration to the battery cell to increase kinetic energy of the gas and, at the same time, the suction pad sucks the gas under vacuum. Therefore, the inventive apparatus may considerably reduce a time required for gas removal.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purposes and do not restrict the scope of the present invention.

FIGS. 2 through 7 are schematic views illustrating a method for manufacturing a battery cell according to an exemplary embodiment of the present invention.

Referring to these drawings, a method for manufacturing a battery cell will be described in detail below.

Figure 1:
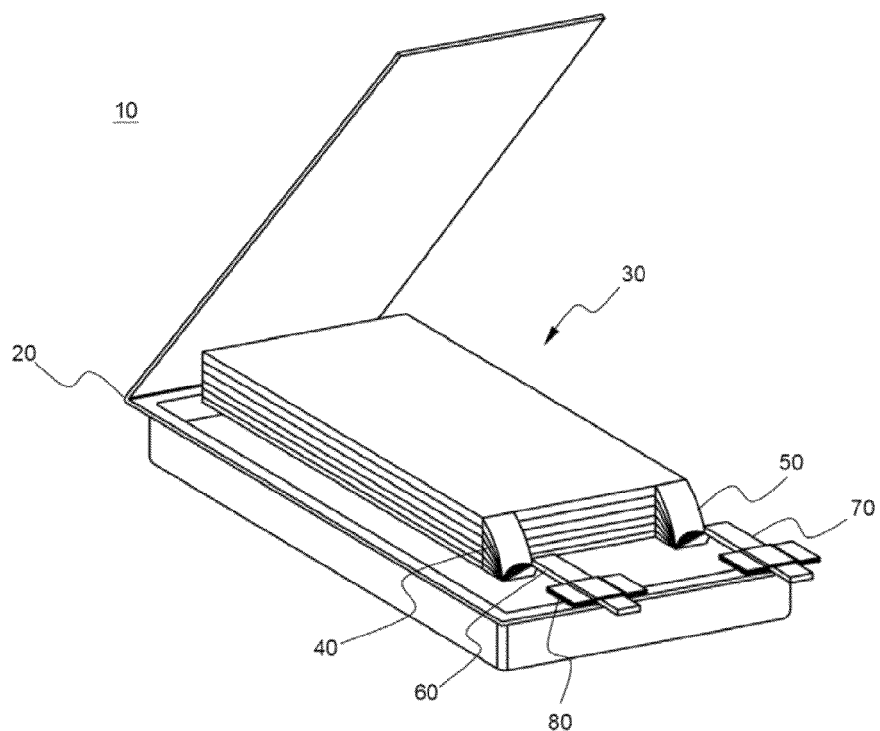
FIG. 1 is an exploded perspective view illustrating a typical structure of a conventional pouch type battery.
Figure 2:
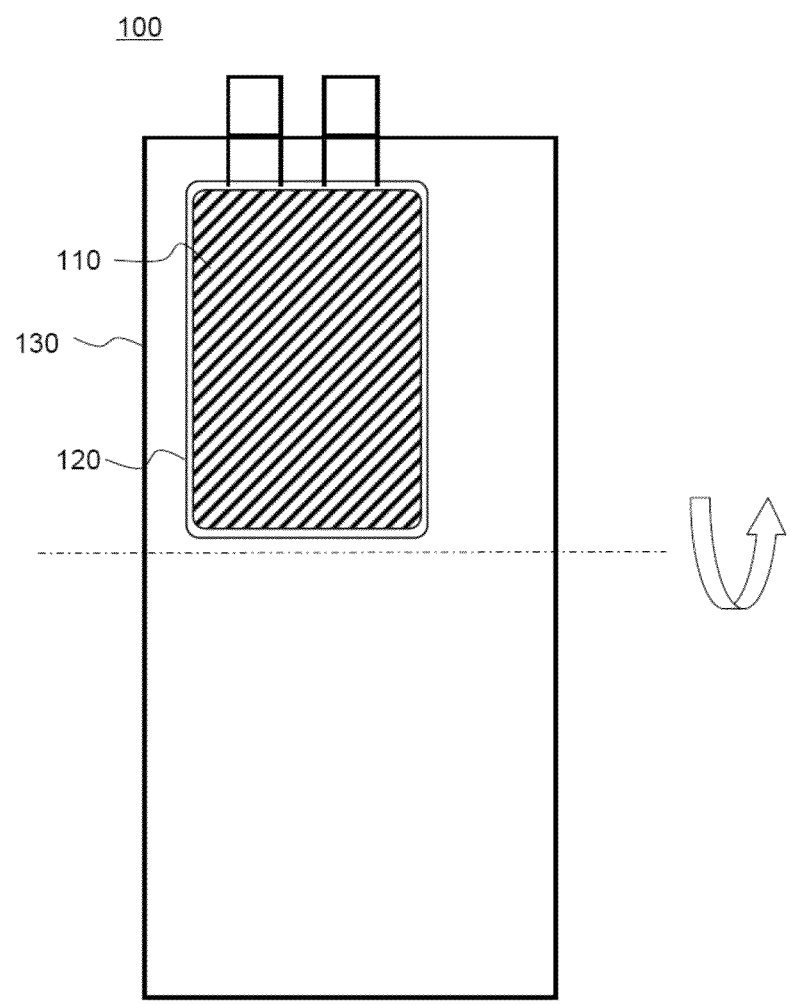
FIGS. 2 through 7 are each schematic views in sequential order, illustrating a method for manufacturing a battery cell according to an exemplary embodiment of the present invention.

First, as shown in FIG. 2, after mounting an electrode assembly 110 on a reception part 120 of a battery case 130, the battery case 130 is folded in half.

Figure 3:
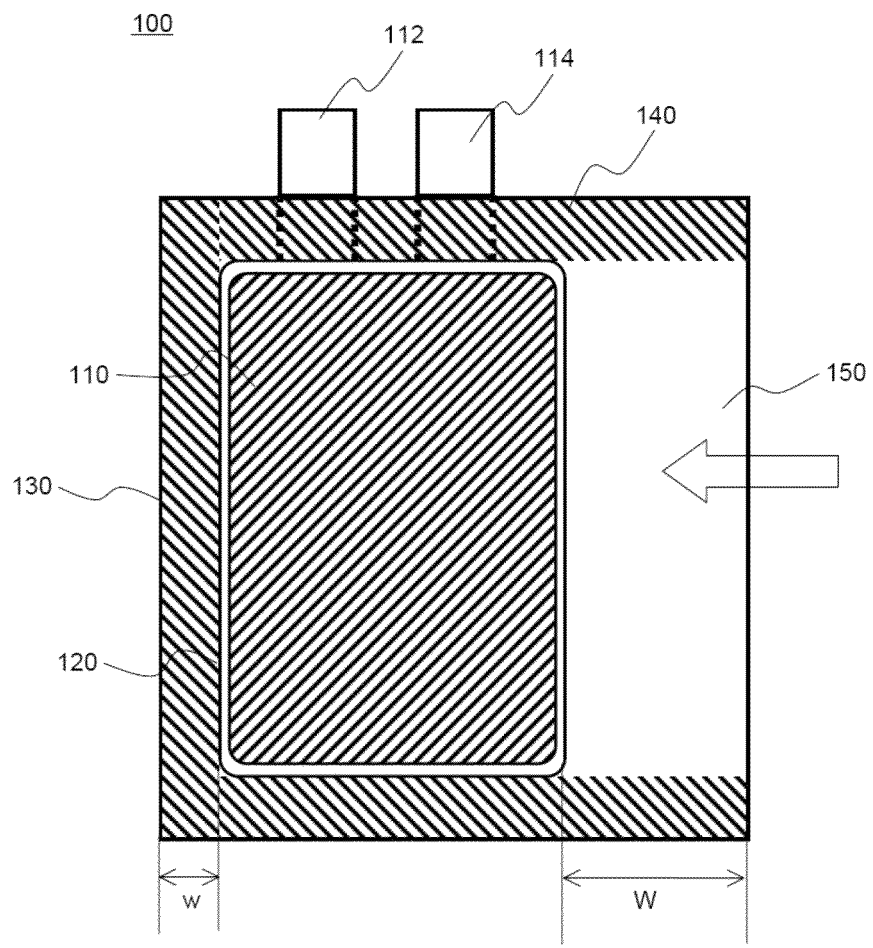

Next, as shown in FIG. 3, as the electrode assembly 110 is mounted on the reception part 120 of the battery case 130, the periphery of the batter case 130 except for an end part 150 thereof is sealed through thermal fusion.

Figure 4:
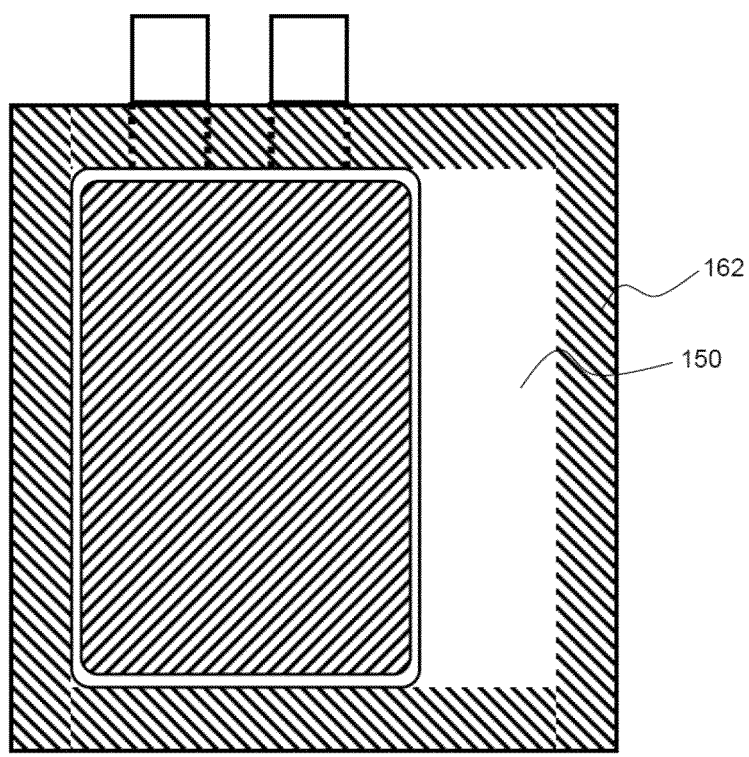

More particularly, the electrode assembly 110 to which electrode terminals 112, 114 are connected, is equipped in the battery case 130 composed of a laminate sheet while having the reception part 120 at one side. Also, among four sides, a sealing part 140 is formed on three sides including the top side wherein the electrode terminals 112, 114 are provided, by heat compression, while the other side 150 remains unsealed. An electrolyte is introduced through such an unsealed part 150 and then, as shown in FIG. 4, the end 162 of an edge side as the unsealed part 150 undergoes thermal fusion, followed by charging-discharging to activate the battery cell 100.

Excess electrolyte and the gas generated in such an activation operation are collected and entrapped at the unsealed part 150.

Figure 5:
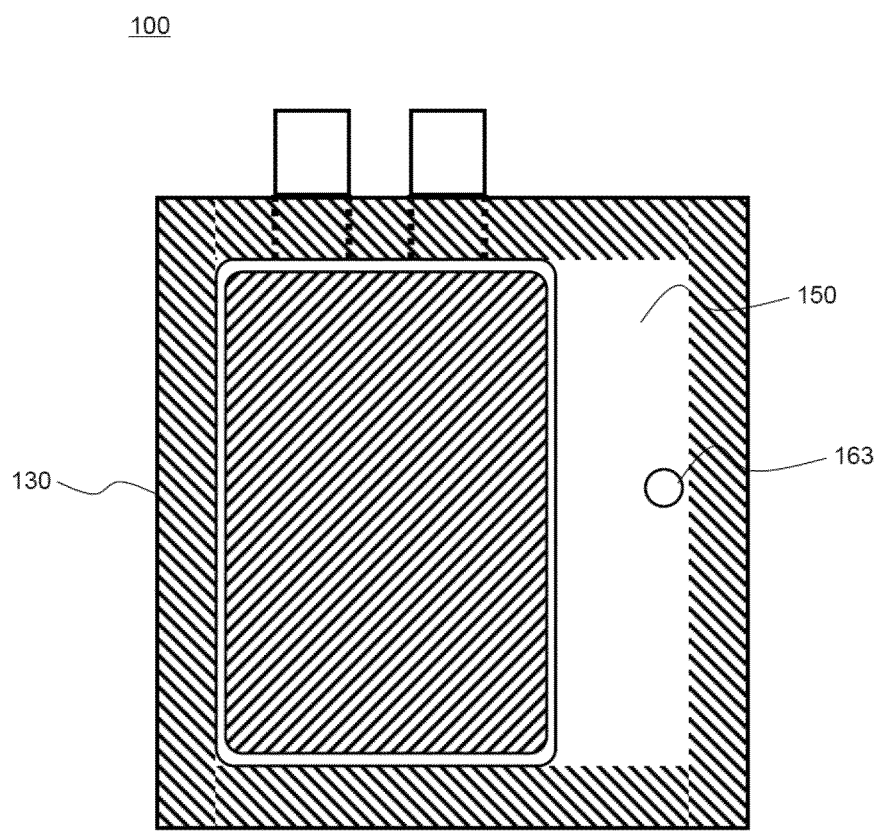

Following this, as shown in FIG. 5, after puncturing the unsealed part 150 inside the end part to form a through-hole 163 communicating with the inside of the battery case 130, top and bottom faces of the battery case 130 are pulled in the opposite direction to each other at the unsealed part 150 to be opened while applying vacuum pressure, thus enabling the gas generated in the activation operation as well as excess electrolyte to be removed.

Figure 6:
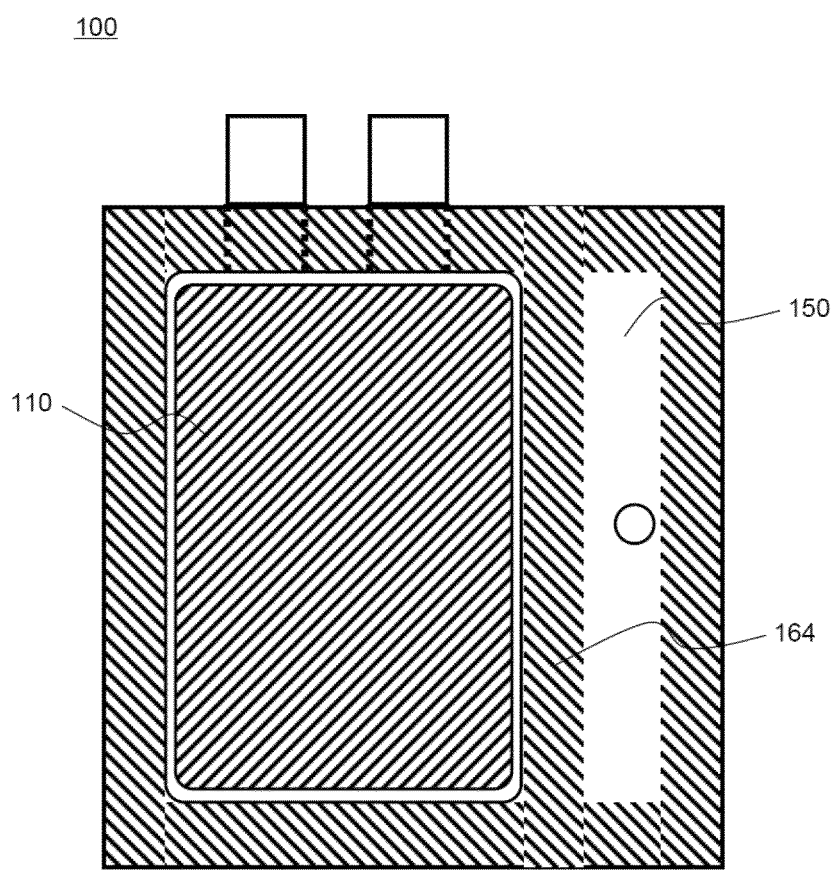
Figure 7:
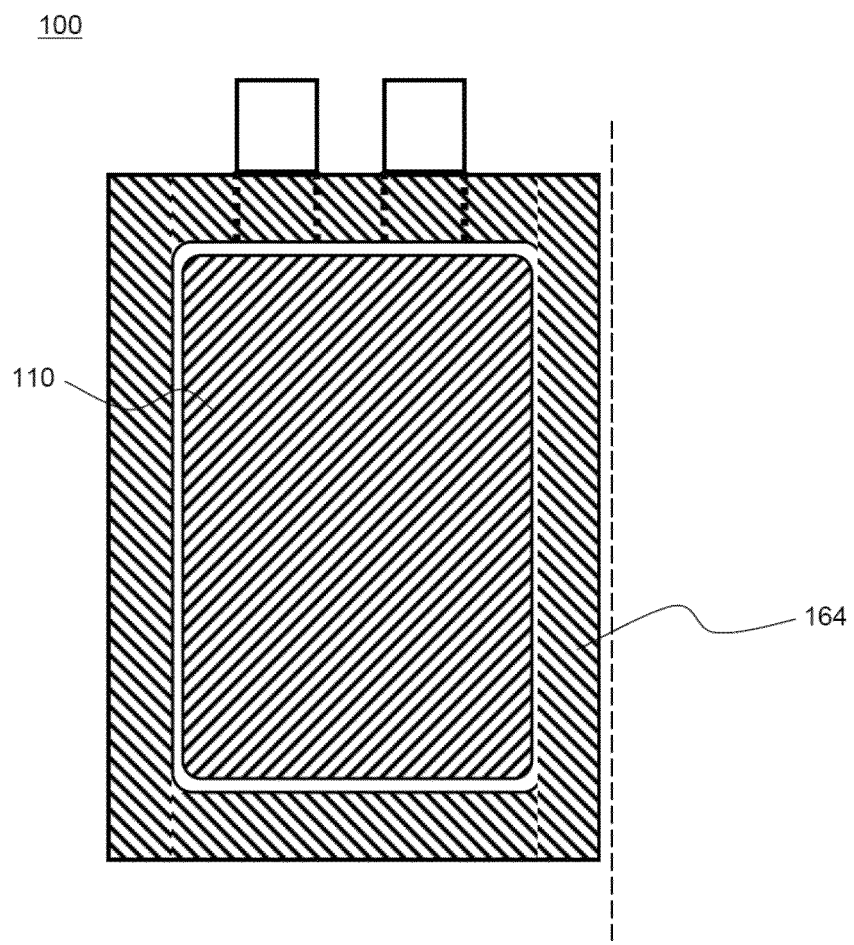

Lastly, as shown in FIGS. 6 and 7, after sealing the inner side 164 of the unsealed part adjacent to the electrode assembly 110 through thermal fusion, the other outer part is cut off to complete the battery cell 100.

In addition, referring to FIG. 3, the battery case 130 may have a rectangular structure in plan view, wherein a width 'W' of an edge side 150 is 200% larger than each width 'w' of the other edge sides.

Figure 8:
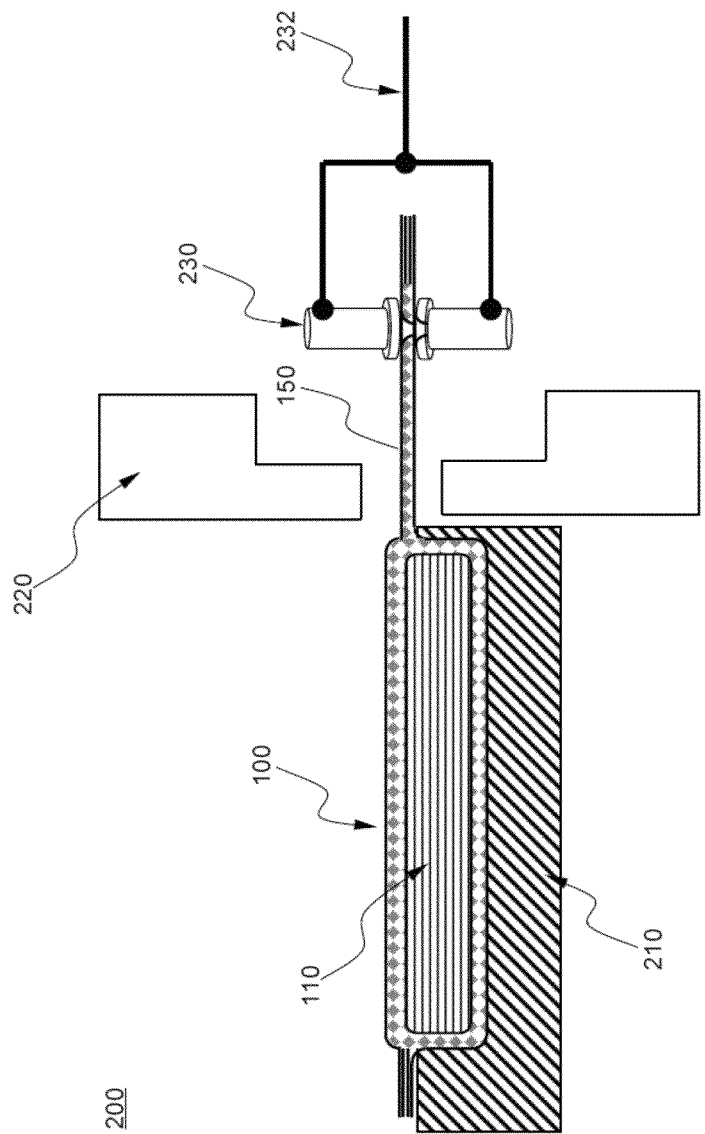
FIGS. 8 through 10 are each cross-sectional views illustrating a gas removal apparatus according to another exemplary embodiment of the present invention.
Figure 9:
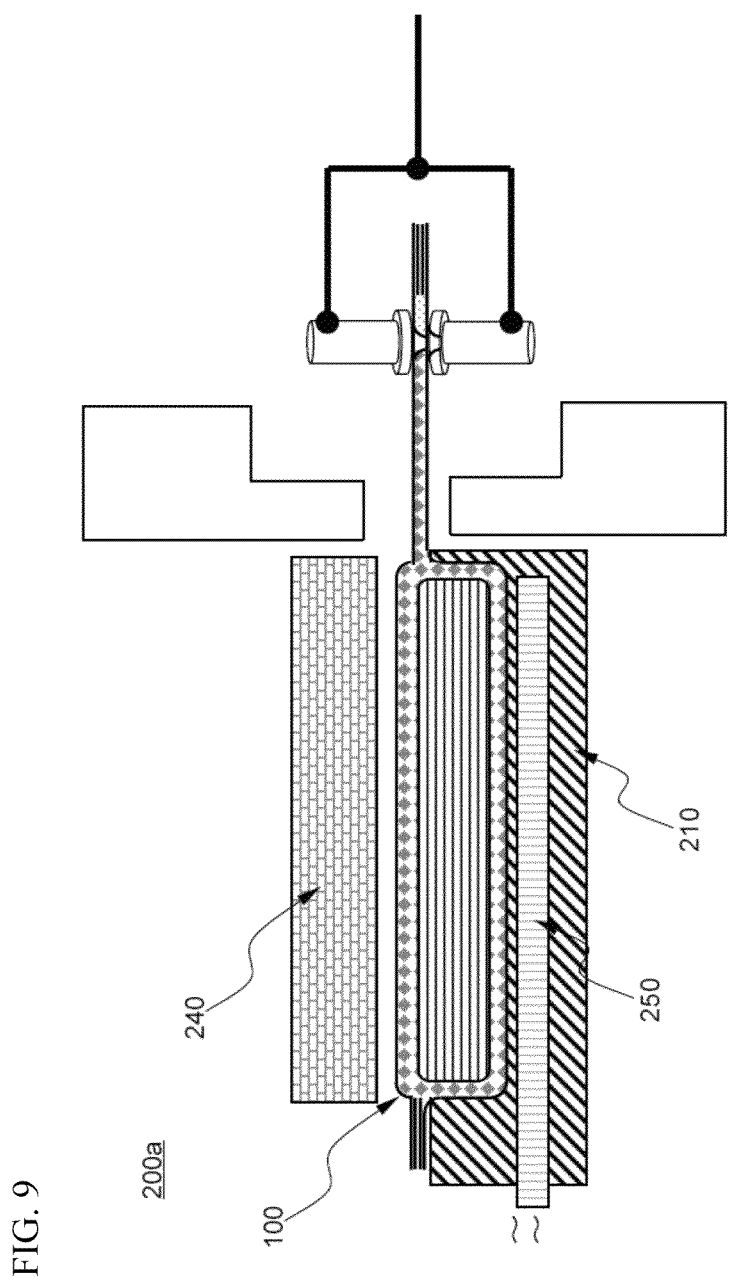
Figure 10:
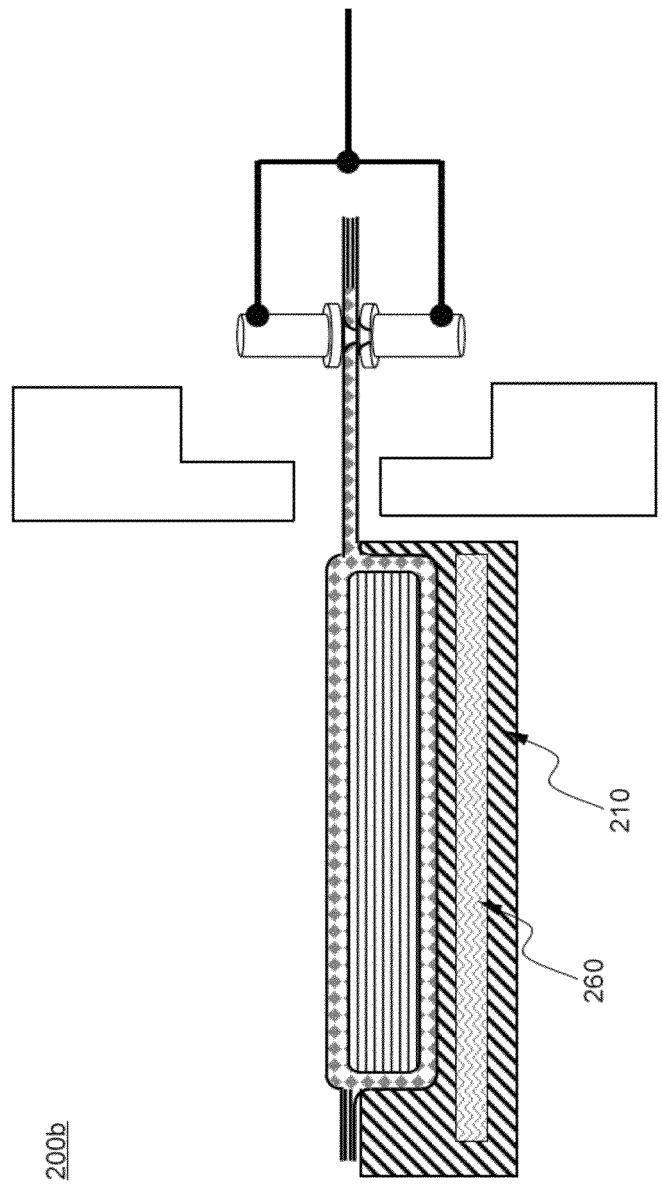

FIGS. 8 through 10 illustrate schematic cross-sectional views of an apparatus for gas removal according to another embodiment of the present invention.

First, referring to FIG. 8 as well as FIG. 5, the gas removal apparatus 200 is used in a process of removing excess electrolyte as well as the gas generated in the operation of activating the battery cell, and comprises a holder 210, a pair of sealing blocks 220, a suction device 230, and a vacuum suction line 232 connected with the suction device 230.

The holder 210 may be provided with the battery cell 100 such that the end part 150 of the battery case 130 having a through-hole 163 formed therein is protruded in one direction and the sealing block 220 is provided at the outer side of the holder 210 in order to seal the end part 150 of the battery case 130 through thermal fusion.

The suction device 230 may pull and open the top and bottom faces of the battery case in opposite directions at the end part 150 of the battery case 130 having the through-hole 163 formed therein while applying vacuum pressure, thus removing excess electrolyte as well as the gas generated in the activation operation.

A gas removal apparatus 200a shown in FIG. 9 is substantially identical to the gas removal apparatus 200 shown in FIG. 8, except that a gas removing device 200a has a press block 240 positioned at top of the battery cell 100 to press down the top of the battery cell 100 and a heater 250 is equipped inside the holder 210 to heat the battery cell 100 and increase kinetic energy of the gas. Therefore, a detailed description thereof will be omitted. However, the press block 240 may of course be included in both the apparatus 100 shown in FIG. 8 and an apparatus 200b in FIG. 10.

The gas removal apparatus 200b in FIG. 10 is substantially identical to the removing apparatus 200 shown in FIG. 8, except that an ultrasonic vibrator 260 for applying ultrasonic vibration to the battery cell 100 to increase kinetic energy of the gas is equipped inside the holder 210. Therefore, a detailed description thereof will be omitted.

Figure 11:
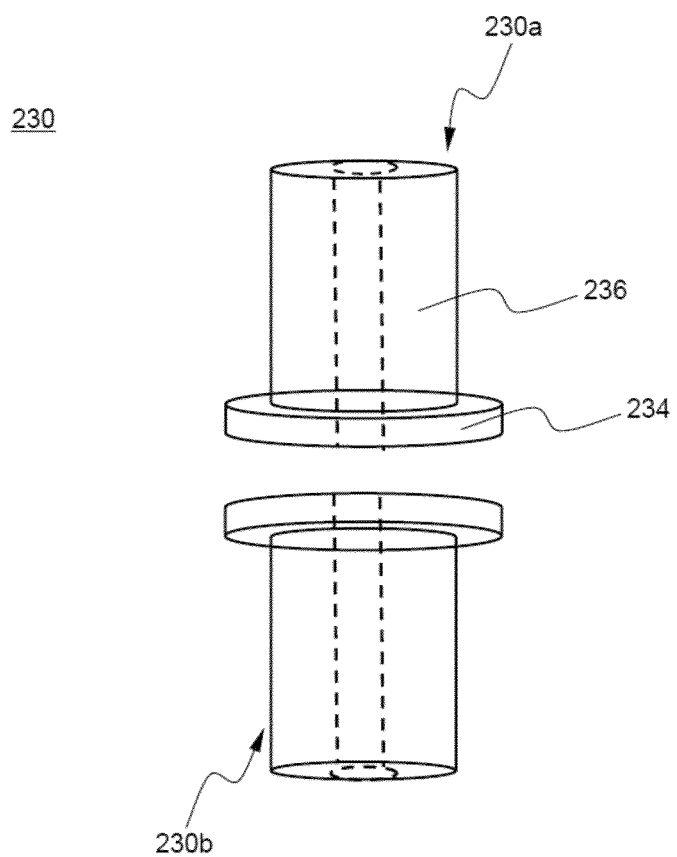
FIG. 11 is an enlarged schematic view illustrating a suction pad shown in FIG. 8.

FIG. 11 is an enlarged schematic view illustrating the suction device 230 comprising a first suction pad 230a contacting the top face of the battery case 130 and a second suction pad 230b contacting the bottom face of the same.

In this regard, each of the first suction pad 230a and the second suction pad 230b may have a construction of an adhesion part 234 contacting the outer side of the battery case 130 and a hollow part 236 that is connected to the adhesion part 234 and communicates with a through-hole 163 formed at the unsealed part 150 of the battery case 130 while applying vacuum pressure.

Although preferred embodiments of the present invention have been described above in conjunction with the accompanying drawings, those skilled in the art will appreciate that various modifications and variations are possible without departing from the scope and spirit of the invention, based on the foregoing description.

[Industrial Applicability]

As apparent from the foregoing, the method for manufacturing a battery cell according to the present invention includes: conducting charge-discharge to activate the battery cell; puncturing an unsealed part inside an end of a battery case to form a through-hole communicating with the inside of the battery case; and pulling and opening top and bottom faces of the battery case in opposite directions at the unsealed part while applying vacuum pressure. As a result, excess electrolyte as well as the gas generated in an activation operation may be rapidly and completely removed.

The invention claimed is:

1. Amethod for manufacturing a battery cell including an electrode assembly and electrolyte provided in a battery case composed of a laminate sheet having a resin layer and a metal layer, comprising:
   (a) thermally fusing and sealing a periphery of the battery case except for an end part thereof while the electrode assembly is mounted in the battery case;
   (b) introducing the electrolyte through the end part and then sealing the end part via thermal fusion;
   (c) charging and discharging the battery cell to activate the battery cell;
   (d) puncturing an unsealed part inside the end part to form a through-hole communicating with an inside of the battery case; and
   (e) pulling top and bottom faces of the battery case in opposite directions to each other at the unsealed part to open the top and bottom faces of the battery case by a suction device while applying vacuum pressure, to thereby remove gas generated during activation as well as excess electrolyte,
   wherein the suction device comprises a first suction pad contacting the top face of the battery case and a second suction pad contacting the bottom face of the battery case, and
   wherein each of the first suction pad and the second suction pad has a structure comprising an adhesion part contacting an outer side of the battery case and a hollow part that is connected to the adhesion part, communicates with a through-hole formed at an unsealed part of the battery case and applies vacuum pressure.

2. The method according to claim 1, wherein the laminate sheet has a laminate structure comprising an external resin layer, a barrier metal layer for shielding air and moisture, and a thermally fusible internal resin layer.

3. The method according to claim 1, wherein the electrode assembly has a winding type, stack type or stack/folding type structure.

4. the method according to claim 1, wherein the battery case has a rectangular structure in plan view and the end part is a first edge side of the battery case.

5. The method according to claim 4, wherein a width of the first edge side is 20 to 300% larger than each width of other edge sides and an end of the first edge side is sealed during thermal fusion for activation.

6. The method according to claim 1, wherein the battery cell is heated in at least one of operations (c) to (e).

7. The method according to claim 1, wherein ultrasonic vibration is applied to the battery cell in at least one of operations (c) to (e).

8. The method according to claim 1, further comprising an operation of sealing inner side of the unsealed part through thermal fusion and then cutting off other outer parts, after operation (e).

* * * * *